(12) United States Patent
Schooley et al.

(10) Patent No.: US 9,470,352 B2
(45) Date of Patent: Oct. 18, 2016

(54) RFID AND PRODUCT LABELLING INTEGRATED IN KNIT COMPOSITE TUBES FOR FLUID DELIVERY SYSTEM

(71) Applicants: Nicholas Clancy Schooley, Denver, CO (US); David Ethan Maretich, Denver, CO (US); Jon Wallace Neal, Denver, CO (US); Richard L. Statler, III, Denver, CO (US); Clifton P. Breay, Littleton, CO (US)

(72) Inventors: Nicholas Clancy Schooley, Denver, CO (US); David Ethan Maretich, Denver, CO (US); Jon Wallace Neal, Denver, CO (US); Richard L. Statler, III, Denver, CO (US); Clifton P. Breay, Littleton, CO (US)

(73) Assignee: Eaton Corporation, Cleveland, OH (US)

(*) Notice: Subject to any disclaimer, the term of this patent is extended or adjusted under 35 U.S.C. 154(b) by 494 days.

(21) Appl. No.: 13/922,567

(22) Filed: Jun. 20, 2013

(65) Prior Publication Data

US 2013/0284299 A1    Oct. 31, 2013

Related U.S. Application Data

(63) Continuation-in-part of application No. 12/983,069, filed on Dec. 31, 2010, now Pat. No. 9,022,077.

(51) Int. Cl.
*F16L 11/12* (2006.01)
*F16L 55/00* (2006.01)
(Continued)

(52) U.S. Cl.
CPC .............. *F16L 55/00* (2013.01); *B29C 70/446* (2013.01); *B29C 70/882* (2013.01); *F16L 9/125* (2013.01); *F16L 9/128* (2013.01); *B29L 2023/22* (2013.01); *F16L 2201/60* (2013.01)

(58) Field of Classification Search
CPC ........................ F16L 11/124; F16L 2201/60

USPC ............................ 138/104, 123, 124; 66/193
See application file for complete search history.

(56) References Cited

U.S. PATENT DOCUMENTS 1,386,444 A * 8/1921 Stibbe ...................... D04B 1/00
                                                        66/190
2,783,174 A    2/1957 Stephens
(Continued)

FOREIGN PATENT DOCUMENTS

EP    0028310    5/1981
EP    0391568    10/1990
(Continued)

OTHER PUBLICATIONS

International Search Report and Written Opinion for International (PCT) Application No. PCT/US2014/041476, mailed Sep. 17, 2014, 14 pages.
(Continued)

*Primary Examiner* — Patrick F Brinson
(74) *Attorney, Agent, or Firm* — Sheridan Ross P.C.

(57) ABSTRACT

The composite tube comprises a tubular arrangement of knitted fiber having plurality of interlocking loops. The knitted pattern allows for variable electrical, mechanical and geometrical options. A matrix material is applied over the knitted fiber pattern and is allowed to cure. The matrix material may be applied by a vacuum bag molding process. The flexible knitted reinforcing layer allows use of an inflatable bladder to hold the reinforcing layer in the desired shape, thereby facilitating tube constructions of varying shapes and diameters. Continuous application of the matrix material avoids overlapping seams that are prone to delamination. Identification and labeling of the composite tube may be achieved with distinguishing knitted patterns having different types and colors of knitted fibers within the knitted reinforcing layer. A clear or translucent matrix material enables viewing of the underlying knitted patterns. Identification may also include RF ID tags Incorporated directly within the knitted reinforcing layer.

20 Claims, 5 Drawing Sheets

(51) Int. Cl.
| | | |
|---|---|---|
| *B29C 70/44* | (2006.01) | |
| *B29C 70/88* | (2006.01) | |
| *F16L 9/128* | (2006.01) | |
| *F16L 9/12* | (2006.01) | |
| *B29L 23/00* | (2006.01) | |

(56) References Cited

U.S. PATENT DOCUMENTS

| | | | |
|---|---|---|---|
| 2,824,033 A | 2/1958 | Chase | |
| 2,945,531 A | 7/1960 | Balcom et al. | |
| 3,091,848 A | 6/1963 | Frank | |
| 3,201,954 A * | 8/1965 | Greczin | D04B 1/102 66/190 |
| 3,202,560 A | 8/1965 | Michael | |
| 3,314,450 A | 4/1967 | Doering et al. | |
| 3,578,028 A * | 5/1971 | Roberts | F16L 11/085 138/123 |
| 3,627,601 A | 12/1971 | Hayes et al. | |
| 3,812,885 A | 5/1974 | Sajben et al. | |
| 3,848,640 A | 11/1974 | Crawford et al. | |
| 3,874,970 A | 4/1975 | Dunn | |
| 3,884,054 A * | 5/1975 | Niederer | D04B 39/06 66/193 |
| 3,920,049 A | 11/1975 | Lippert et al. | |
| 3,971,233 A | 7/1976 | Amaya et al. | |
| 4,021,180 A | 5/1977 | Smith | |
| 4,065,339 A | 12/1977 | Lippert et al. | |
| 4,131,701 A | 12/1978 | Vanauken | |
| 4,200,126 A | 4/1980 | Fish | |
| 4,241,763 A | 12/1980 | Antal et al. | |
| 4,275,768 A * | 6/1981 | Riggs | F16L 11/124 138/104 |
| 4,330,811 A | 5/1982 | Bordner | |
| 4,375,009 A * | 2/1983 | Fearnside | D04B 1/14 138/127 |
| 4,438,958 A | 3/1984 | De Cenzo | |
| 4,600,615 A | 7/1986 | Hyodo et al. | |
| 4,657,623 A | 4/1987 | Wesch | |
| 4,671,096 A | 6/1987 | Crosby, Jr. | |
| 4,675,780 A | 6/1987 | Barnes et al. | |
| 4,679,599 A * | 7/1987 | Newberry | F16L 11/085 138/104 |
| 4,800,113 A | 1/1989 | O'Connor | |
| 4,838,971 A | 6/1989 | Cacak | |
| 4,846,392 A | 7/1989 | Hinshaw | |
| 4,868,038 A | 9/1989 | McCullough, Jr. et al. | |
| 4,871,491 A | 10/1989 | McMahon et al. | |
| 5,015,013 A | 5/1991 | Nadin | |
| 5,045,251 A | 9/1991 | Johnson | |
| 5,071,506 A | 12/1991 | Nelson et al. | |
| 5,090,742 A | 2/1992 | Cohen et al. | |
| 5,097,870 A | 3/1992 | Williams | |
| 5,113,551 A | 5/1992 | Roberts | |
| 5,132,168 A | 7/1992 | Meyn et al. | |
| 5,139,710 A | 8/1992 | Smith | |
| 5,152,630 A | 10/1992 | Walloch | |
| 5,252,984 A | 10/1993 | Dorrie et al. | |
| 5,290,230 A | 3/1994 | Ainsworth et al. | |
| 5,323,631 A | 6/1994 | Weykamp et al. | |
| 5,402,592 A * | 4/1995 | Caveney | G09F 3/205 40/316 |
| 5,437,899 A | 8/1995 | Quigley | |
| 5,468,327 A | 11/1995 | Pawlowicz et al. | |
| 5,472,769 A | 12/1995 | Goerz, Jr. et al. | |
| 5,549,024 A | 8/1996 | Ricco | |
| 5,746,555 A | 5/1998 | McEvoy | |
| 6,183,904 B1 | 2/2001 | Kuboshima et al. | |
| 6,240,969 B1 | 6/2001 | Wildermuth | |
| 6,244,092 B1 | 6/2001 | Grobbenhaar | |
| 6,315,004 B1 | 11/2001 | Wellman et al. | |
| 6,321,574 B1 * | 11/2001 | Marker | D04B 9/12 66/19 |
| 6,357,485 B2 | 3/2002 | Quigley et al. | |
| 6,409,222 B1 | 6/2002 | Donoho et al. | |
| 6,523,230 B1 | 2/2003 | Weinhold | |
| 6,953,061 B2 | 10/2005 | Della Putta et al. | |
| 6,983,767 B2 * | 1/2006 | Rickards | F16L 57/00 138/104 |
| 7,144,625 B2 | 12/2006 | Tunis | |
| 7,150,932 B1 | 12/2006 | Hofler et al. | |
| 7,200,973 B2 | 4/2007 | Tunis | |
| 7,267,739 B2 | 9/2007 | Blackmore et al. | |
| 7,330,559 B2 | 2/2008 | Akino | |
| 7,588,056 B2 | 9/2009 | Lord et al. | |
| 7,931,958 B2 | 4/2011 | Arai et al. | |
| 7,972,371 B2 | 7/2011 | Martin | |
| 8,176,943 B2 | 5/2012 | Stroempl et al. | |
| 8,770,233 B2 * | 7/2014 | Mezzalira | D04B 1/225 138/125 |
| 8,985,159 B2 * | 3/2015 | Caneva | D04B 21/205 138/123 |
| 2003/0024584 A1 | 2/2003 | Godel et al. | |
| 2004/0099016 A1 * | 5/2004 | Shepherd | D04B 1/126 66/8 |
| 2004/0134555 A1 | 7/2004 | Powell et al. | |
| 2004/0222013 A1 | 11/2004 | Linder | |
| 2005/0212161 A1 | 9/2005 | Aisenbrey | |
| 2009/0116907 A1 * | 5/2009 | Gaya I Altirriba | D06N 3/0009 405/45 |
| 2009/0229452 A1 | 9/2009 | Milwich et al. | |
| 2010/0003840 A1 | 1/2010 | Breay et al. | |
| 2010/0011694 A1 | 1/2010 | Spaans et al. | |
| 2010/0116941 A1 | 5/2010 | Ciolczyk et al. | |
| 2010/0147446 A1 | 6/2010 | Ciolczyk et al. | |
| 2011/0174410 A1 | 7/2011 | Li et al. | |
| 2011/0209791 A1 * | 9/2011 | Mezzalira | D04B 1/102 138/126 |
| 2011/0254444 A1 | 10/2011 | Yeulash et al. | |
| 2011/0262621 A1 | 10/2011 | Wynn et al. | |
| 2012/0090770 A1 | 4/2012 | Cavaliere et al. | |
| 2012/0103683 A1 | 5/2012 | Ishida | |
| 2012/0152584 A1 | 6/2012 | Goodson | |
| 2012/0168012 A1 | 7/2012 | Statler, III et al. | |
| 2012/0234425 A1 * | 9/2012 | Berardi | F16L 11/12 138/137 |
| 2013/0277083 A1 | 10/2013 | Gauckler et al. | |
| 2013/0284303 A1 | 10/2013 | Gauckler et al. | |

FOREIGN PATENT DOCUMENTS

| | | |
|---|---|---|
| EP | 1749642 | 2/2007 |
| GB | 1174292 | 12/1969 |
| GB | 1506182 | 4/1978 |
| GB | 2211266 | 6/1989 |
| WO | WO 01/41993 | 6/2001 |
| WO | WO 03/023104 | 3/2003 |
| WO | WO 2009/087372 | 7/2009 |

OTHER PUBLICATIONS

Partial International Search Report for International (PCT) Application No. PCT/US2014/041471, mailed Sep. 25, 2014, 7 pages.
International Search Report and Written Opinion for International (PCT) Application No. PCT/US2014/042033, mailed Oct. 1, 2014, 13 pages.
Official Action for U.S. Appl. No. 13/922,531, mailed Oct. 7, 2014, 8 pages.
Watson "Building composite tubes with West System® epoxy and braided fibers," EPOXYWORKS, Spring 2008, No. 26, 3 pages.
"Guide to Vacuum Bagging," Lavender, http://www.lavender-ce.com/wp-content/uploads/guide-to-vacuum-bagging.pdf, date unknown, 3 pages.
"Technology Overview," COMPOTECH Structural Composit Tubes, http://www.compotech.com/downloadfile.aspx?&dl=2, date unknown, 8 pages.
"Circular knitting," Wikipedia, http://en.wikipedia.org/wiki/Circular_ting, printed Oct. 27, 2010, 1 page.
"Knitting," Wikipedia, http://en.wikipedia.org/wiki/Knitting, printed Oct. 29, 2010, 18 pages.
International Search Report and Written Opinion for International (PCT) Patent Application No. PCT/US2014/041471, mailed Dec. 11, 2014 19 pages.

(56) References Cited

OTHER PUBLICATIONS

Official Action for U.S. Appl. No. 12/983,069, mailed Sep. 26, 2014 7 pages.
Notice of Allowance for U.S. Appl. No. 12/983,069, mailed Jan. 26, 2015 7 pages.
Official Action for U.S. Appl. No. 13/922,531, mailed Jan. 5, 2015 9 pages.
Notice of Allowance for U.S. Appl. No. 13/922,531, mailed Apr. 13, 2015 8 pages.

\* cited by examiner

RFID AND PRODUCT LABELLING INTEGRATED IN KNIT COMPOSITE TUBES FOR FLUID DELIVERY SYSTEM

CROSS REFERENCE TO RELATED APPLICATIONS

This application is a continuation-in-part application of co-pending application Ser. No. 12/983,069 filed on 31 Dec. 2010 and entitled: Composite Tube For Fluid Delivery System, of which said application is hereby incorporated by reference in its entirety.

FIELD OF THE INVENTION

The present invention relates to composite tubes used in fluid delivery systems, and more particularly, to composite tubes having a knitted reinforcement layer and integral identification including an RFID tag and labeling knitted within the knitted reinforcement layer.

BACKGROUND OF THE INVENTION

Polymer based compositions are becoming increasingly used in a variety of different technological applications to include vehicle and aerospace applications. Polymer based composites are used in not only structural applications, but also in construction of system components in order to control the electrical conductivity and resistivity of the components. Polymers widely vary in their ability to dissipate static charges and to prevent the composite material from acting as a mere conductor of electrical current.

Polymeric composites with both conductive and nonconductive properties can be chosen by incremental addition of selected materials such as carbon black, carbon fiber, metallic fibers and powders, as well as selecting inherently conductive polymeric compositions such as polyaniline. Further, it is known that by varying the amount of conductive or resistive particles added to the composition, some incremental control can be obtained for establishing the conductive or resistive properties of the material.

Fuel lines, particularly those used in aircraft, should preferably have the ability to accommodate a wide range of electrical performance requirements depending upon the location of the fuel line, the type of fuel line and other factors. It is desirable to have fuel lines that are resistant enough to prevent them from acting as conductors of electrical current such as caused by a lightening strike, yet the fuel lines should be conductive enough to prevent static charge build up that could result in an electrical arc creating a spark within the fuel line.

Various efforts have been made to isolate fuel lines to ensure the fuel lines maintain the desired electrical properties; however, traditional fuel lines are unable to accommodate wide electrical performance requirements when comparing an event such as a lightning strike versus slow but incremental static buildup.

One example of a reference that discloses fuel lines with controlled resistivity includes the International Publication Number WO2009/087372. This reference describes a glass reinforced composite pipe having an electrically nonconductive polymeric resin matrix and an electrically nonconductive tow reinforcement such as glass fiber. The composition further includes a selected dispersion of an electrically conductive particulate filler, such as carbon black in which the resistivity of the outer portion of the composite pipe is preferably set between 50 K-ohms per meter length and 4 M-ohms per meter length.

Another reference that addresses electrical conductivity problems associated with fuel carrying pipes or tubes is the European Patent Application Publication No. 0028310. This reference discloses a filament reinforced plastic article having a fluid impermeable wall with a relatively low surface resistivity to prevent build up of electrostatic charge. The article includes overlapping bands of filament coated with a plastic material. A minor portion of the filament in some of the bands is electrically conductive by use of electrically conductive filaments that may be distributed throughout the wall of the article.

Another example of a fuel pipe or tube addressing desired electrical properties is the U.S. Patent Application Publication No. U.S. 2010/011,694. This reference describes ducting comprising at least one multi-layer pipe having respective inner and outer layers made of a composite plastic material, and reinforced by an electrically conductive reinforcing layer. An intermediate layer is provided for stiffening of the pipe when flexed and/or to insulate the pipe. Each of the inner and outer layers has at least one winding with contiguous turns of a material made of a composite thermoplastic. The pipe is able to discharge electrostatic build up through its inner layer, and electrical charges due to lightening are deflected away from the pipe through its outer layer.

While these references may be adequate for their intended purposes, there is still a need to provide fluid conveying tubes or pipes that are economical to manufacture, and may accommodate wide ranges of electrical specifications both for static discharge and lightening protection. Further, there is need to provide a tube or pipe construction that can be shaped and sized for many different applications. For example, there is a need to provide the capability of manufacturing fuel lines for aircraft in which the tubes can be easily sized and shaped to fit within constrained spaces.

One limitation associated with fluid conveying tubes in general is that a secondary or additional manufacturing step is required to label fluid conveying components. Particularly for fluid conveying components that are used to convey hazardous fluids, there are certain safety regulations and industry standards which require marking or labeling of the components. A few traditional methods to label fluid conveying components include printed stickers, painting, engraving, stamping, or laser marking Each of these methods requires a secondary operation to label the component after it is manufactured. For example, one typical sequence of manufacturing steps for a fluid conveying component may be forming of the component (by molding or extrusion), cutting the component to the desired length, bending the component in the desired shape, anodizing the component, and then finally marking the component with a permanent label. As one can appreciate, the final step of marking the component with a permanent label adds additional cost, as well as potential risk. More specifically, there may be an increased probability that a component becomes mismarked or not marked at all if the component has to undergo an additional and separate processing step. Further, it may be more difficult to track and locate the component for accurate labeling in an environment in which there may be dozens of different components manufactured at the same location within the same overall manufacturing process.

One particular problem associated with composite tubing is delamination that can occur between joined sections of tubes or layers among tubes. The most common manufacturing practice is to simply overlap abutting edges of tube sections to be joined. Although initially these overlapping edges may provide an adequate structural connection, vibration and chemical degradation by contact of the fuel with the composite material eventually results in some degree of delamination. Particularly in pipe runs that must follow a torturous path, there may be multiple sections of tubes/pipes that are joined. In these cases, it may be impractical or impossible to use mechanical couplers at each junction due to weight and size constraints. Therefore, there is also a need to provide a composite tube construction in which long continuous pipe runs having complex shapes are created without a concern for delamination between abutting tube sections.

Although there have been advances made with respect to the chemical aspects of composite materials, most present day aircraft are still constructed with metallic tubing (such as aluminum, stainless steel, or titanium). In order to electrically tune these metallic tubes, various static discharge and electrical isolators are required, which add cost and weight to the aircraft.

SUMMARY OF THE INVENTION

In accordance with the invention, a composite tube is provided that is especially adapted for use in fluid delivery systems containing fuel or other corrosive chemical formulations. The invention further comprises a method of manufacturing the composite tube as well as a composite tube system in which a plurality of composite tubes are connected for delivery of a fluid within a larger assembly, such as a vehicle or aircraft.

The composite tube comprises a tubular arrangement of fiber created by a knitted fibrous pattern characterized by a plurality of interlocking loops. The term "knitted fiber" is defined as group of fibers that are interconnected by a plurality of consecutive loops or stitches. As each row of loops is formed, a new loop is pulled through an existing loop. Selected knitted patterns may be formed to provide the desired density or spacing between the fibers. The meandering path or course of the fibers can be adjusted in terms of spacing of the consecutive loops to achieve the desired density of fibers per unit area. As distinguished from weaving in which threads or fiber extend linearly and substantially more parallel in a lengthwise or crosswise direction, the knitted pattern of the present invention comprises fibers that follow meandering paths to form loops. The loops may be symmetric or irregular shaped. Accordingly, the course or paths of the knitted fibers have multiple directional changes to include at least one directional change of approximately 180 degrees in order to form a loop. The knitted pattern has an inherent bias or stretch/contracting capability that enables a user to further adjust the density or spacing of the fibers by selectively stretching the fibers to a desired shape. A particular knitted pattern can be chosen to also modify the desired spacing and density of the knitted fibers. Examples of different knitted patterns could include plain or pearl stitching. Other types of knitting may be used to further adjust knitted pattern parameters such as fiber density. These other types of knitting may include warp knitting, weft knitting and plaited stitching.

A number of features of the composite tube can be precisely controlled with the use of a knitted pattern. For example, different types of fiber can be knitted to adjust the conductivity or resistivity of the composite tube. Monitoring devices can also be incorporated in the knitted pattern, such as various strain gauges or other sensors.

The particular geometry of the composite tube can be made in an infinite number of shapes based on the ability to knit tubular sections in desired shapes. Not only can the diameter of the tube be changed, but also turns or bends and other features can be created. Intersecting sections of tubes can be attached by stitching the abutting faces to one another. Thus, the knitted pattern of fibers can be considered a continuous integral support structure which eliminates the requirement for overlapping sections at tube intersection points, thereby avoiding delamination between the layers of material.

A circular knitting machine can be used to create the tubular knitted patterns. One example of a circular knitting machine comprises a cylinder rotatable in one or both directions. A series of circumferentially spaced needle slots are located on a peripheral surface. A series of individually movable knitting needles are reciprocated in the associated needle slots. A series of jacks are arranged below the associated needles in an end to end relationship for reciprocating with the associated needles in the needle slots. Each of the jacks has a butt extending out of the associated needle slot. A camming mechanism includes a number of raising cams arranged to define a cam track through which each butt passes when the cylinder is rotating. The knitting can be affected whenever each butt of the jack comes in contact with the raising cams, and is thereby moved along with the associated needle upwardly in the associated needle slot. This machine is described in the U.S. Pat. No. 3,971,233, and this reference is hereby incorporated by reference for the purpose of disclosing a circular knitting machine capable of producing a tubular configuration of a knitted pattern.

The use of a conventional circular knitting machine such as used for fabrics is capable of creating the tubular arrangement of fiber in the present invention. The fiber may include materials such as Kevlar®, carbon fiber, glass, and combinations thereof. The tubular knitted pattern provides for variable electrical, mechanical, and geometrical options that are difficult if not impossible to achieve with conventional composite tube manufacturing processes.

Once the knitted pattern is completed, the composite tube is then formed by a vacuum bag molding process. In general, a vacuum bag molding process involves a two sided mold that shapes both the internal and external surfaces of an object. Typically, the interior mold or mandrel is rigid, and the exterior mold is a flexible membrane or vacuum bag. In the present invention, in lieu of a rigid inner core or mandrel, an inflatable bladder is placed within the knitted pattern to create internal pressure. Preferably, the inflatable bladder is provided in a twisted, helical pattern that ensures the inflatable bladder is capable of applying even internal pressure against the knitted pattern that may have various turns or changes in diameter. The twisted helical pattern enables the bladder to be inflated beyond just a cylindrical shape. The bladder has excess material that can fill larger spaces or may easily fit within smaller areas thereby accommodating different shaped tubes to be formed. Once the inflatable tube is in place, a polymeric matrix is applied over the knitted pattern. The matrix material flows between the gaps in the knitted pattern and the matrix material is provided in sufficient quantity to create a desired thickness based on tube specifications. Preferably, the matrix material is the combination of a composite resin and epoxy formulated with the desired properties for the particular tube application.

Once the matrix is applied, additional layers are placed over the matrix to include a perforated plastic or relief plastic layer, an absorptive layer over the perforated plastic layer, and an external impervious vacuum bag over the absorptive material. A vacuum port is provided for the drawing of a vacuum to remove air, and to thereby provide a compressive force against the matrix layer. The external pressure can be increased by placing the assembly in an autoclave which can increase the differential pressures. The excess matrix material is allowed to flow through the perforated plastic layer and is absorbed within the absorptive layer. The matrix is allowed to cure, and molding materials are then removed leaving a composite tube shell which can be trimmed and finished. Finishing may include painting, part marking, application of decals, etc.

Modular and adjustable external fixturing may be used to hold critical geometry areas on the tube such as neck downs, mount points, and end configurations. This modular/adjustable exterior fixturing can also be used to secure flanges or other hardware, and may be attached to the ends of the tube or other locations on the tube.

By controlling the electrical and mechanical properties of both the fiber material and the matrix material, the desired resistive properties can be achieved. By machining and otherwise finishing the tube, the surface and volumetric resistivity of the product can also be adjusted.

As mentioned with respect to the integral or one piece fiber knitted pattern, delamination is avoided at tube intersection points or other areas where separate tube sections are joined since the matrix material can be applied continuously across these intersection points. A continuously extending tubular fiber in combination with the continuously applied matrix material avoids all laminated seams or overlapping areas.

It is well known that most composite tubes are formed on rigid inner mandrels having limited flexibility. This reduces the available geometries for a tube to be formed because ultimately, the mandrel must be removed from the interior of the tube section. In the present invention, the shape holding feature of a tube design is built into the underlying fiber pattern itself. This method therefore allows for use of a very flexible and collapsible inner mold such as the inflatable bladder. Nevertheless, a vacuum bag molding technique can be used for necessary internal and external compressed molding, while critical exterior features and varied end configurations can be held in place by modular exterior fixturing. The manufacturing method of the invention therefore allows for extreme variability in creating tube intersections, small turn radii, varied diameters, varied shapes, and also contributes to very low tooling costs. Therefore, it is apparent that the term "tube" or "tubing" of the present invention covers not only circular shaped cross sectional elements, but also a wide range of other hollow shapes in which varied diameters and shapes can be used to complete the entire array of differing fluid conveying elements within a fluid conveying system.

Further, this manufacturing method allows for the construction of very long pipe runs that traditionally require many laminated seams or junctions attached by couplers. The manufacturing method also allows for electronic integration of various monitoring sensors or heating elements to control temperatures, for example to comply with anti-icing requirements for aircraft. The composite tube of the present invention provides many material advantages to include a non-metallic, a seamless composite that can be formed into an infinite number of rigid shapes, and the composite tube is tunable for fine/incremental variations of electrical and mechanical properties.

In another aspect of the invention, it includes composite tubes that incorporate integral identification capability. In one preferred embodiment, the integral identification includes labeling created by a modified knitted pattern for the knitted reinforcement layer. The label or identifier is integrated with the tube by use of a different pattern of knitted material or different types of knitted material used within the knitted arrangement of the reinforcement layer. For example, labeling could be achieved by using a distinct type of fiber or thread, different colored fiber/thread, and/or distinct groups of fibers or strands of thread in which the computerized circular knitting machine knits the labeling information directly within the same knitted pattern that forms the knitted reinforcement layer. Another option for providing this type of integral knitted identifier is to change only the knitted pattern that may provide enough visual distinctiveness to serve as an identifier. For example, in the event the knitted reinforcement layer includes a relatively loose knit arrangement in terms of the size of gaps between knitted fibers, an identifier can be added by simply changing the closeness or spacing of the knitted loops and forming these changed loop patterns into numbers or letters, all of which could be achieved by the computerized circular knitting machine. The ability to provide integral identification also provides an opportunity for more detailed identification or labeling of the fluid conveying component without materially affecting either the quality of the composite tube or increasing the overall cost. Further, this integral identification capability may enhance certain quality control measures in terms of increasing the capability to effectively track and inspect different types of fluid conveying components. Since the particular stitching pattern and number and types of fibers can be easily altered within a computerized circular knitting machine, this provides the opportunity to label the fluid conveying components in a vast range of options. Examples of information that can be provided includes, but is not limited to, company names, company logos, customer and manufacture specific information such as manufacturing and lot numbers, assembly and manufacturing instructions, part and stock numbers, dates, cage codes, serial numbers, flow directions, color coding, part specifications, conductive/nonconductive areas, bonding regions, aircraft/vehicle coordinates, and various material descriptions and designations.

In another preferred embodiment of the integral identification capability, the invention may include the use of radiofrequency identification (RFID). More specifically, the composite tube may include an integral RFID tag for purposes of identifying the fluid conveying component. Currently available RFID tags are capable of storing enough data that detailed information can be recorded for a product, and the data storage capability of the RFID tag may typically exceed the amount of data required for identification. Accordingly, detailed information regarding the fluid conveying component could be easily stored in the RFID tag as electronic data and accessible by an external RFID reader. This preferred embodiment includes different ways in which the RFID tag could be incorporated in the composite tube. For example, the RFID tag could be woven directly into the knitted reinforcement material in which one or more surfaces of the RFID tag could include its own fibers that are woven or otherwise knitted within the knitted reinforcement layer, or the periphery of the RFID tag could be in the form of a substrate that is secured to the knitted reinforcement layer with a dedicated stitch pattern stitched through the periphery of the substrate. Alternatively, the RFID tag could be placed between layers of the knitted reinforcement material, or the RFID tag could be introduced into the tube construction during the layup of matrix material in which the tag could be added to a selected location in the cross sectional area of the tube.

Other features and advantages of the present invention will become apparent from the detailed description taken in conjunction with the drawings.

DETAILED DESCRIPTION

Figure 1:
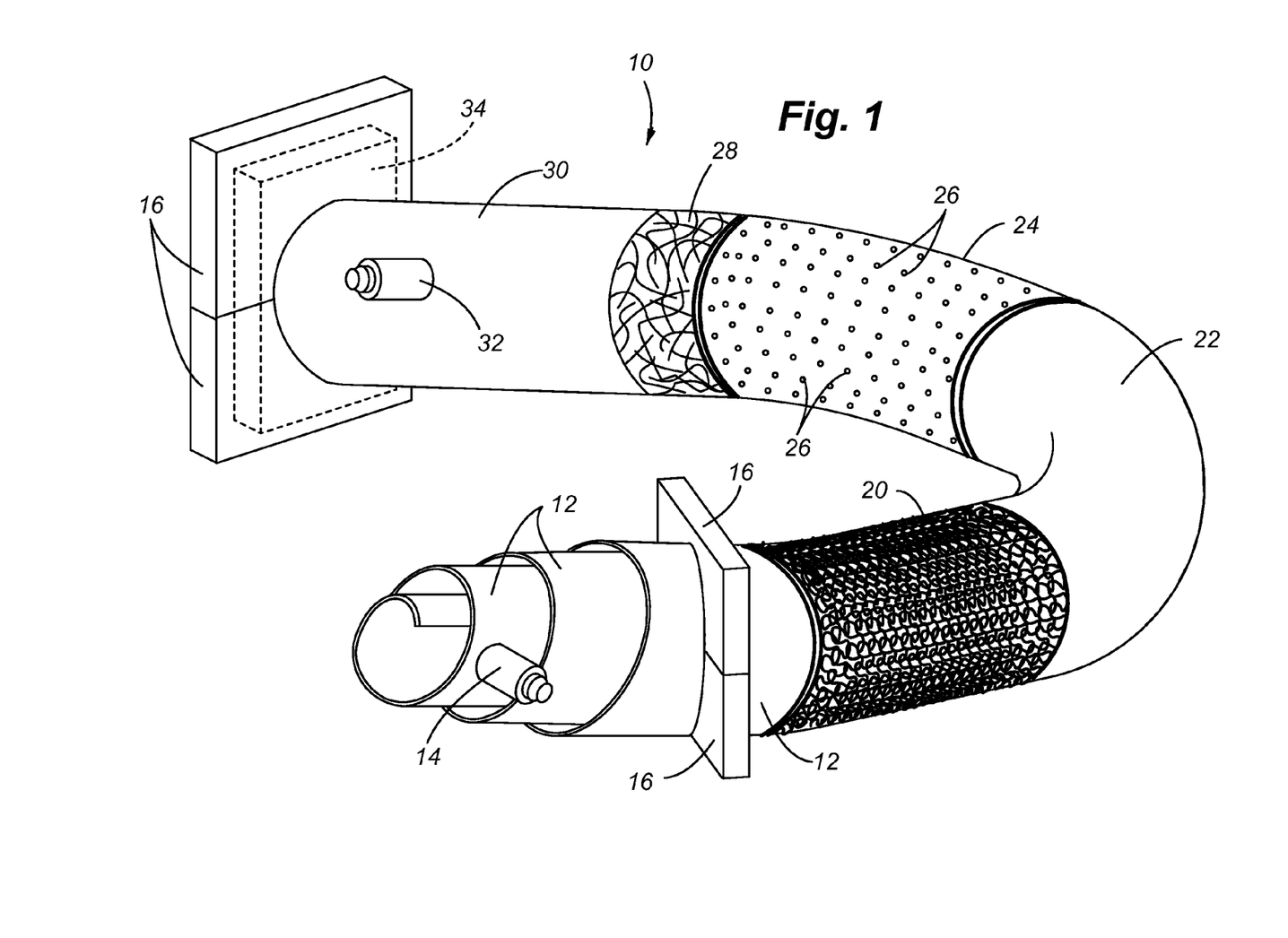
FIG. 1 is a perspective view of a section of composite tubing formed in accordance with a vacuum bag molding method.

Referring to FIG. 1, a method of manufacturing the composite tube of the present invention is illustrated. The composite tube 10 is formed by a vacuum bag molding process. For illustrative purposes, the successive layers of material are shown as exposed. First, a spiraled inner bladder 12 is placed within the interior opening of a knitted reinforcement layer 20. The tubular knitted pattern formed for the reinforcement layer 20 is constructed with the previously described knitted pattern having a selected group of fibers formed in a plurality of loops. The inner bladder 12 is inflated through inflation port 14, in order to expand the knitted reinforcement layer 20 to a desired diameter or shape. Additionally, the knitted reinforcement layer 20 is shown as having a bend. The reinforcement layer can be knitted with the bend. This type of knitting to produce a bend could be similar to the formation of a bend in a woven garment, such as the heel portion of a knitted sock or slipper.

Each end of the composite tube section to be formed may have external fixtures 16 secured thereto to stabilize the shape of the composite tube, and to otherwise provide a means by which external hardware may be secured to the tube structure. In the example of FIG. 1, the external fixture 16 on the left side of the diagram includes an opening for holding a piece of hardware such as a flange 34 that may be secured to the composite tube during the vacuum bag molding process. The external fixture can also be used to modify the tube shape, for example, a rigid box shaped fixture placed over and end of the tube can be used to restrict the expansion and form the final product into a tube having a geometrical shaped end with flat sides. In addition to use of fixtures on the ends of the tubes, the fixtures 16 may be placed at intermediate or interior sections of the tube between the ends in order to stabilize the shape of the tube at that intermediate location(s).

Next, a matrix layer 22 is placed over the knitted reinforcement layer 20, the matrix preferably including components of resin and epoxy materials. The matrix material is typically in a liquid form that enables the matrix layer to flow between the gaps in the knitted reinforcement layer 20, and to otherwise fully encapsulate the knitted layer 20. The amount of matrix is applied to set the desired external and internal tube diameters. The matrix may be applied in a number of ways, such as by an atomized spray, or by brushing the matrix layer over the knitted layer.

After the matrix material is applied, a perforated plastic layer 24 is placed over the matrix layer 22. The perforated plastic layer 24 comprises a plurality of perforations 26 as shown.

Next an absorptive layer 28 is placed over the perforated plastic layer 24. Finally, an impermeable vacuum bag 30 is placed over the absorptive layer 28. A vacuum port 32 is formed on the vacuum bag. A vacuum is applied through the vacuum port to remove air between the layers of material, thereby resulting in an external force applied to the matrix layer 22. This external force can be increased as mentioned by placing the assembly in a pressurized chamber such as an autoclave. Excess matrix material is allowed to flow through the perforations 26, and the absorptive layer 28 absorbs a significant portion of the excess matrix material flowing through the perforations.

The composite tube is then allowed to cure, and curing may be accelerated by heating in an oven or autoclave. After curing, the external layers are stripped from the cured and hardened matrix layer. The spiraled inner bladder 12 is deflated, and then removed leaving the composite tube. The tube may then finished by polishing the exposed surfaces and painting, or the tube may be left unfinished. Although the preferred embodiment shows the use of both the absorptive and perforated layers, it shall be understood that the particular vacuum bag molding process chosen may incorporate other layers or may eliminate one or more of these layers based on the particular type of tube section to be created.

Figures 2, 3, 3A, 3B:
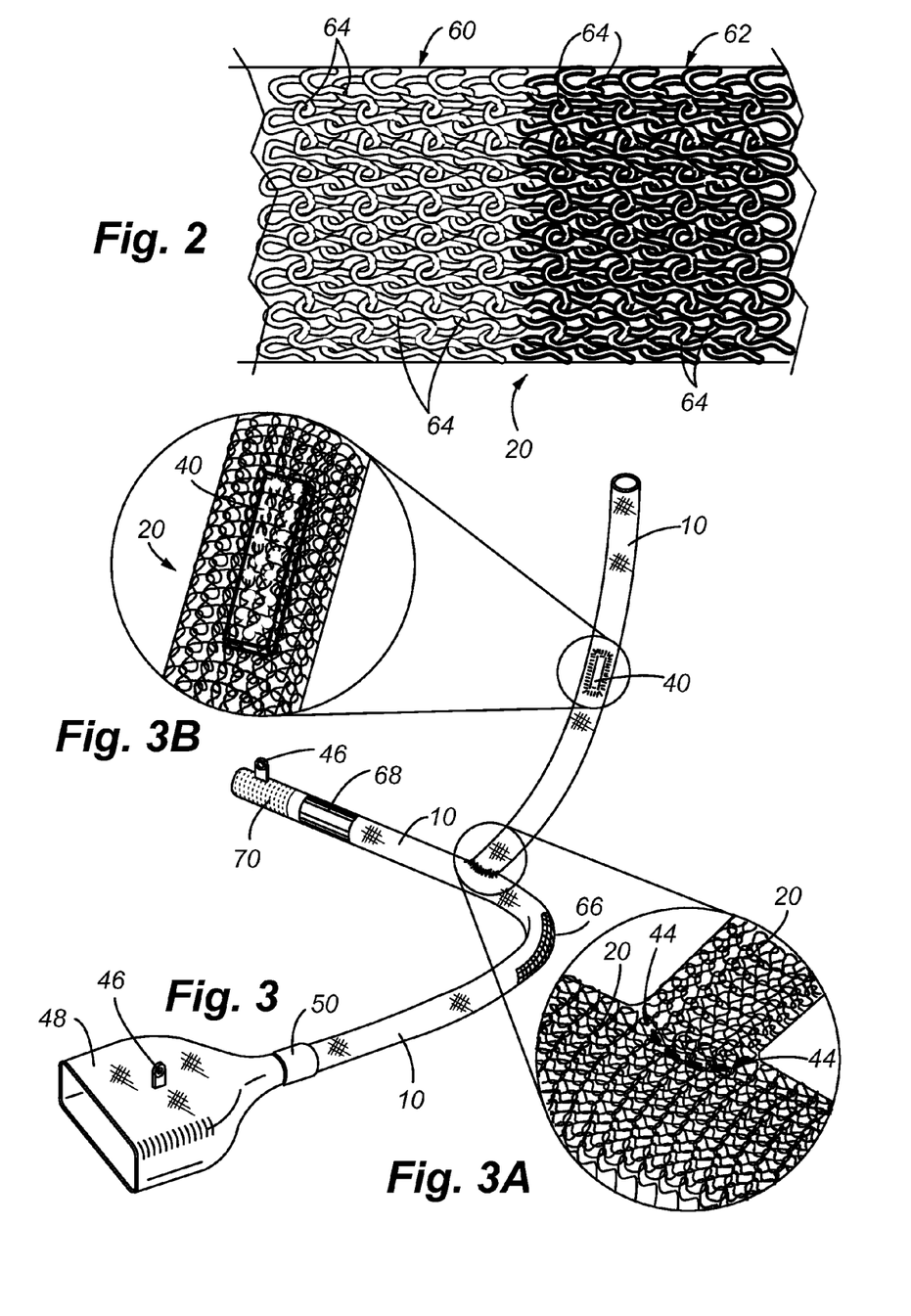
FIG. 2 is a plan view of one example of a knitted pattern usable with the tubular arrangement of fiber of the present invention.
FIG. 3 is a perspective view of a finished composite tube having a plurality of features.
FIG. 3A is a greatly enlarged perspective view illustrating the knitted connection between abutting sections of tubing.
FIG. 3B is a greatly enlarged perspective view illustrating the integration of a monitoring feature in the knitted pattern, such as an electronic element.

Referring to FIG. 2, one example is shown for the knitted reinforcement layer 22. The layer is characterized by one or more sets of fibers and the knitted pattern forming a plurality of interlocking loops. More specifically, FIG. 2 illustrates two sets of fibers 60 and 62, and the fibers knitted in a meandering pattern such that a plurality of loops are formed in successive rows that join at interlocking loop points 64. FIG. 2 provides an example of how different sets of fibers can be used to provide distinct boundaries for changing performance characteristics of the tube while maintaining continuous material integrity without the need to overlap layers of material. For example, the first set of fibers 60 may have greater resistive properties, while the second set of fibers 62 may have greater conductive characteristics. Each set of fibers may include different types of fibers within each set that are also selected to provide the desired electrical or mechanical characteristics, or other characteristics. Therefore, one can appreciate the ability of the knitted reinforcement layer 20 to provide precise specifications for both strength and electrical conductivity/resistivity as a function of the geometry and location.

Referring to FIG. 3, a finished composite tube structure 10 is shown having a number of different features/characteristics. The area of the tube located at the bend 66 represents an area that may have a greater density knit pattern or additional fibers at the bend to better support the tube at that location, and also fibers knitted in a curvature that provides the bend shape. The knitted material shown at area 66 is covered by the matrix layer, but is shown as exposed for illustrative purposes in this figure to denote an area having a different knit pattern. Area 68 on the tube may represent an area having either a different type of matrix material applied, a different knitted pattern, or different knitted materials, the intent being to illustrate how a very small portion of the tube can be modified in performance characteristics, yet avoids traditional overlapping layers of matrix material that are prone to delamination. Area 70 illustrates yet another change in either the knitted reinforcement layer and/or the matrix material in order to support a protruding hardware element 46. Area 40 in FIG. 3 and FIG. 3B are intended to illustrate incorporation of an electronic element such as a strain gauge or temperature monitor that can be incorporated directly into the knitted pattern, or may itself be made of a fibrous material which can be knitted directly into the knitted layer 20. The electronic element could also be one which measures electrical static buildup and voltage differentials across various portions of the tube. Such electronic elements can be used to monitor the state of the tube, such as the internal pressure, temperature, and other environmental factors. FIG. 3A illustrates the reinforcement layer 20 with two intersecting tubes that are knitted together at intersecting knit line 44. At this location, sets of fibers from both sections of tube can be looped with one another for a very secure connection. When the matrix material is applied over the intersecting knit line 44, the matrix material is continuous and therefore a traditional laminated seam is avoided. The modified section 48 has a geometric shape that is quite different than a cylindrical tube. This section may be produced with the use of external fixtures (not shown), similar to the manner in which the fixture 16 holds the flange 34. Area 50 may represent a reinforced portion of the tube, such as by applying additional matrix material thereby thickening the tube wall and/or increasing the density of the knitted pattern. Although not shown, the tube could also be made in a very flat shape with a narrow internal cavity, this shape being referred to as a clearance flat.

Figure 4:
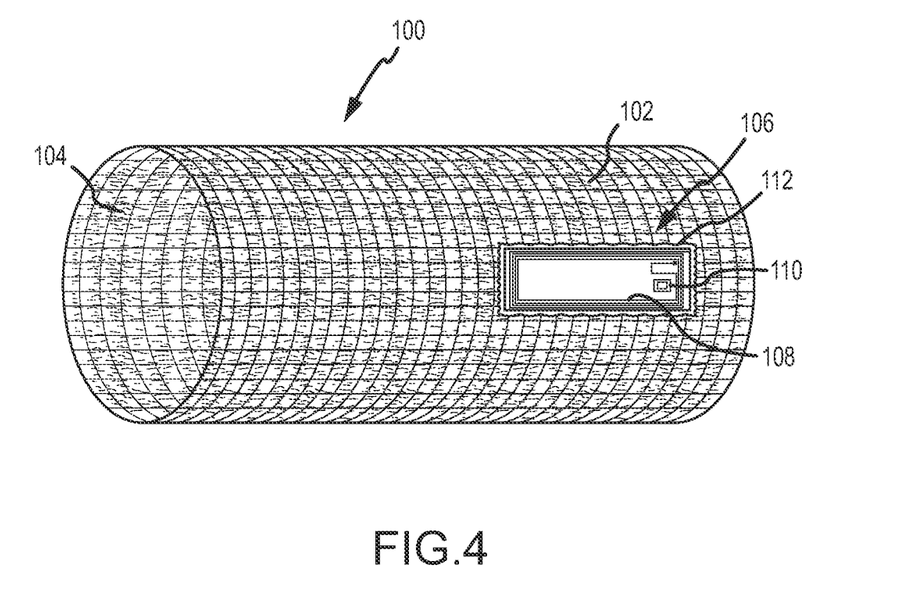
FIG. 4 is a perspective view of a tubular shaped knitted reinforcement layer incorporating an identifier, namely, a first type of RFID tag according to an embodiment of the invention.

Referring to FIG. 4, another preferred embodiment of the invention is illustrated. This figure illustrates a perspective view of a tubular shaped knitted reinforcement layer incorporating an integral identifier, namely, a first type of RFID tag. More specifically, FIG. 4 is illustrates a tubular shaped knitted reinforcement layer 100 for a composite tube to be formed, in which an RFID tag 106 is secured within the body 102 of the knitted material. The RFID tag 106 illustrated is intended to represent any number of types of RFID tags that may be used to identify products, including both passive and active RFID tags, and hybrids thereof. There are certain advantages associated with the various types of RFID tags. For passive RFID tags, they do not require a power source and are often a preferred solution, assuming the interrogation field of the scanning antenna has sufficient power or the product marked with the passive RFID tag is sufficiently close to the interrogation field. The particular RFID tag 106 illustrated in FIG. 4 may represent a passive RFID tag, including a coil 108 and associated circuitry 110. Stitched border 112 represents a selected stitching pattern that can be incorporated in the knitted reinforcement layer 100 to positively attach the peripheral edge of the RFID tag 106 to the reinforcement layer. For example, the peripheral edge of the RFID tag 106 could be stitched directly into the reinforcement layer with fibers from the stitched border 112. There are a number of other ways in which the RF ID tag 106 could be incorporated within the reinforcement layer 100. For example, if the knitted reinforcement layer is provided in multiple layers, the RFID tag 106 could be secured between the layers which therefore may not require stitching. Further, it should be understood that while the RFID tag has been illustrated as located between the opposite ends of the reinforcement layer 100, the RFID tag 106 could be located at or adjacent either end, or the tag 106 could be stitched within the interior surface 104 of the knitted reinforcement layer 100. In yet another aspect of the invention, it is contemplated that the RFID tag 106 is not a completely independent and separate component from the knitted reinforcement layer, but rather, some elements of the RFID tag 106 could be formed from the knitted reinforcement layer. For example, for a passive RFID tag, the coil 108 could be formed with selected fibers from the knitted reinforcement layer, and therefore the remaining elements of the RFID tag could be incorporated within a very small substrate to support the required circuitry 110. By use of a circular knitting machine, the coil 108 could be easily formed within a knit created by the machine in which a selected conductive fiber(s) could be used to form the coil 108.

Figure 5:
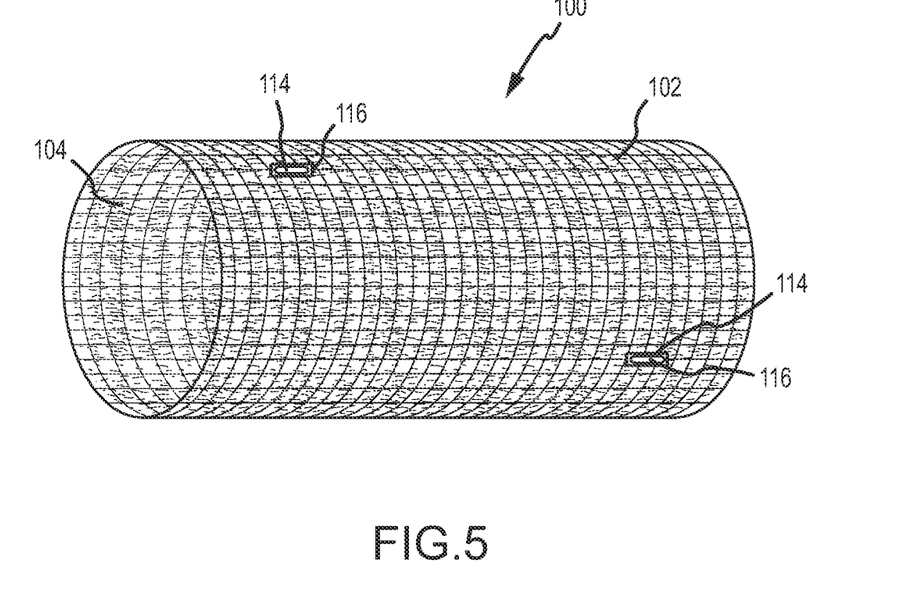
FIG. 5 is a perspective view of a tubular shaped knitted reinforcement layer incorporating an identifier, namely, a second type of RFID tag according to another embodiment of the invention.

Referring to FIG. 5, another type of RFID tag is illustrated, namely, an RFID tag 114 incorporated within a very small capsule. The smaller size of the RFID tag shown may enable more than one tag to be used. For example, one RFID tag could be used to specifically identify the fluid conveying component, while another RFID tag could be used to identify the fluid conveying system or sub-assemblies of the system. The tag 114 is sufficiently small so that it may be conveniently wedged between fibers of the knitted reinforcement layer 100, or the tag could also be positively attached by a peripheral stitching pattern 116 in which one or more threads from the peripheral stitching pattern 116 may attached directly to the tag 114. This tag may also be secured to the knitted reinforcement layer 100 by being placed between folded portions of the layer 100, or the layer 100 could include multiple layers of material with the tag placed between layers.

For both of the types of RFID tags 106 and 114, they may also be incorporated within a composite tube by simply placing these tags within the matrix material as it is applied during manufacturing. Therefore, it should be clear that there are number of options available for incorporating RFID tags without altering or unnecessarily complicating the overall composite tube manufacturing process.

There are a number of advantages in using RFID tags in the present invention. This type of identification is wireless and does not require physical contact with a reading or interrogation device. Therefore, automatic identification and tracking can occur in a very non-intrusive manner. Use of a RFID tag reduces risk in misidentification of a composite tube or other fluid conveying component. The identification capability is provided in the initial steps of manufacturing rather than a post production/manufacturing effort as is the case with traditional labeling or tagging techniques; thus early identification helps to eliminate inadvertent non-marking or mismarking. The automatic nature of the RFID tag as an identifier also reduces the risk of human error in marking and the failure to mark fluid conveying components.

Because of the data capacity in newer RFID tags, sufficient data is provided for recording detailed information on the manufactured part, including, but not limited to, customer specific information, assembly and manufacturing instructions, part numbers, date and cage codes, serial numbers, part specifications, aircraft coordinates, material designations, hazardous handling instructions, and the like. Further, the integration of an RFID tag also allows automated tracking of a part as it is manufactured and/or incorporated within a fluid conveying system. A component marked with an RFID tag can be easily located within a manufacturing facility, and can also be tracked throughout the assembly and installation steps as well. Therefore, the RFID tag enables traceability of the component throughout the product's lifecycle. Further, in terms of inspections and inventory control, an RFID tag has advantages because identification can translate into nearly instantaneous reports or notifications for defective or otherwise potentially nonconforming parts. Further, RFID tags are advantageous over traditional stamped or inked tags/labels during packaging and shipment. Inventory control is easily verified in which tagged components within packing containers/boxes can be interrogated to confirm contents of the container/boxes without opening the contents. Unlike ink marking or other manually prepared tags, RFID tags integrated within the internal cross-sectional area of the tube cannot be obscured or removed. Further, RFID tags are modifiable in terms of the particular information recorded and stored; therefore RFID tag data can be modified over time as the component is manufactured, shipped, installed, etc. Finally, fluid conveying systems within aircraft are typically found within very constrained spaces and there may be very few locations that are visible. Once a fluid conveying system is installed, it becomes very difficult to identify and replace selected components since it may not be immediately known what particular part number is compatible for placement. With an RFID tagging system, each separate component of the fluid conveying system can be interrogated as installed by use of a small interrogator or reader that can be easily inserted within the small spaces of the installed fluid conveying system. The electronic nature of the data stored may also make identifying old or discontinued parts easier for replacement with currently available compatible parts.

Figure 6:
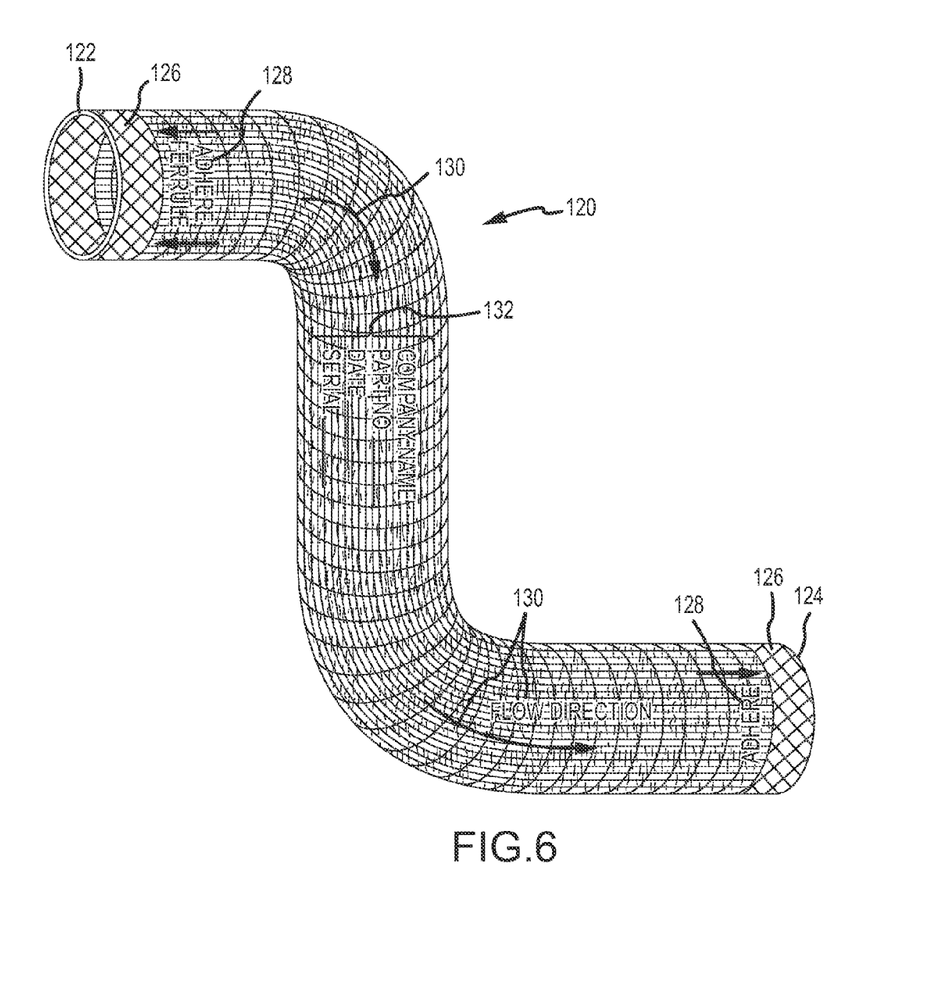
FIG. 6 is a perspective view of a tubular shaped knitted reinforcement layer incorporating an identifier, namely, a knitted label that is integral with the knitted reinforcement layer according to a another embodiment of the invention.

Referring to FIG. 6, another embodiment of the invention is illustrated with respect to composite tubes that incorporate integral identification or labeling. FIG. 6 illustrates a knitted reinforcement layer 120 having two bends or turns, however it shall be understood that the shape of the reinforcement layer 120 in FIG. 6 is simply exemplary, and as with the previous embodiments, this fluid conveying embodiment is not limited to any particular shape or configuration. The reinforcement layer 120 has a plurality of identifying markings, and this figure is intended to illustrate the markings comprising knitted fibers or groups of fibers/strands incorporated directly into the knitted reinforcement layer. As shown, the ends 122 and 124 of the reinforcement layer 120 may both include a distinct stitching pattern and/or fibers of different color or texture in a crosshatched pattern 126. This pattern 126 could indicate a designation for the type of connection or seal to be made between the respective ends 122 and 124 and adjoining tube sections or fluid conveying components (not shown). Other markings are provided including attaching or assembly instructions 128, fluid flow direction indicators 130, and part or component identification data 132. The identification data 132 may include information such as the manufacturer's name, the part number, the date upon which the part is manufactured, and a corresponding serial number or other identification number for the particular fluid conveying component. For each of these markings, they may comprise a distinct knitted pattern, different types of knitted fibers, different groups of fibers or strands of threads, or fibers of different colors and/or textures. In a finished composite tubing construction, the matrix material applied has a color that may enable the markings to be viewed with the unaided eye; accordingly, the matrix material may preferably have a substantially clear or translucent color. In another aspect of this embodiment, it may also be desirable to disguise the marking in which the markings may be visible only with the aid of a particular wavelength of light. For example, a ultra-violet light source could be used to detect the markings through the overlying matrix material that is transparent only when viewed through this selected wavelength of light.

Figure 7:
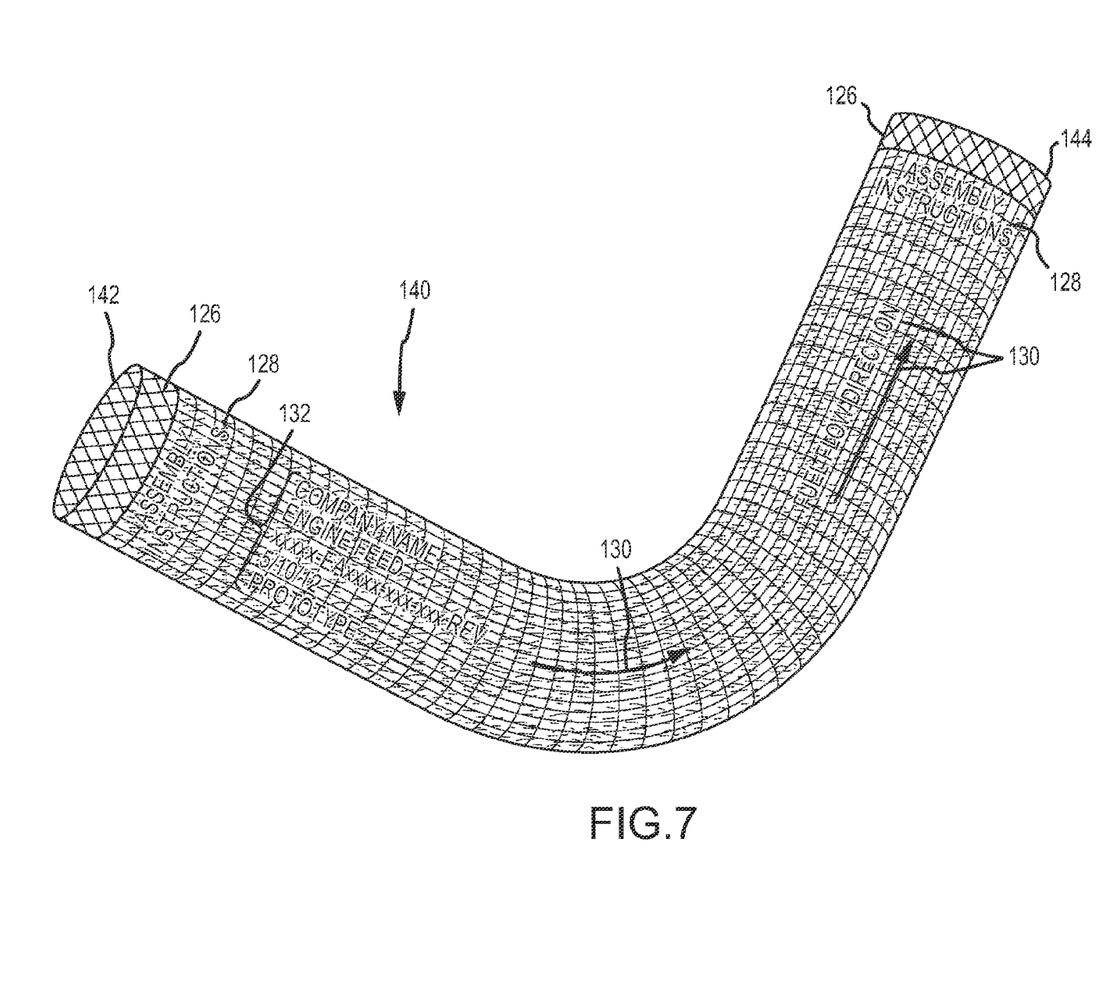
FIG. 7 is a perspective view of another tubular shaped knitted reinforcement layer incorporating an identifier, namely, another knitted label that is integral with the knitted reinforcement layer according to yet another embodiment of the invention.

Referring to FIG. 7, another example of a knitted reinforcement layer 140 is illustrated, including various markings as shown including the crosshatched pattern 126 located at the ends 142 and 144, attaching or assembly instructions 128, flow direction indicators 130, and identification data 132. In this example, the reinforcement layer 140 has a single bend or turn, and it again shall be understood that the knitted reinforcement layer 140 incorporating the integral identification or labeling is not limited to any particular shape or configuration. As can be appreciated by a review of the embodiments for FIGS. 6 and 7, detailed labeling of the fluid conveying components can be achieved within the knitted reinforcement layer without having to execute an additional processing or manufacturing step as required with traditional labeling techniques. By knitting to create the identification/labeling, this provides a simplified and permanent solution because the identification/labeling is protected by an overlying matrix material. The identification/labeling cannot be inadvertently removed by wear or abrasion, which may occur if identification/labeling was applied according prior art techniques of printing or engraving on the exterior surface of the fluid conveying component, or by use an externally applied tag.

In another aspect of the integral identification, it is also contemplated that identification/labeling may also be achieved with a combination of the RFID tags and the distinct knitting patterns and/or knitting fibers. For example, it may be desirable to visually display assembly instructions and flow directions by use of the distinct knitting patterns or fibers, but it may be desirable to record identification data electronically so that such identification data may be revised over time. This combination provides yet further options to optimize identification/labeling in a simplified yet permanent and cost effective manner.

In another aspect of the present invention, a composite tube system is provided for incorporation within a larger assembly such as an aircraft or vehicle. According to the system, a plurality of separate composite tubes form a fluid conveying network with tubes having various diameters, lengths, and shapes. Because of the ease at which shape and diameter modifications can be achieved, the composite tube system is highly adaptable for applications in which there are constrained spaces for mounting a fluid conveying network, such as a fuel system.

While the present invention has been set forth in various embodiments, it shall be understood that changes and modifications to the preferred embodiments can be made within the scope of the claims appended hereto.

What is claimed is:

1. A composite element especially adapted for conveying fluid, comprising:
   a knitted reinforcement layer comprising a plurality of interlocking loops of fiber formed in a plurality of rows, each said loop having no more than a single fiber and each said row having at least three adjacent loops of fiber, and adjacent rows of said plurality of rows interlocking one another at a single interlocking point for corresponding interlocking pairs of loops to form a first knitted pattern;
   an integral identifier incorporated within said knitted reinforcement layer, said integral identifier comprising at least one of (i) a second knitted pattern incorporated within said first knitted pattern, and said second knitted pattern being visually distinct from said first knitted pattern and (ii) a plurality of different threads or fibers being visually distinct from threads or fibers of said first knitted pattern;
   a matrix applied over said reinforcement layer, said matrix comprising resin and epoxy constituents, said matrix filling voids between said loops of said reinforcement layer, and between and around both said reinforcement layer and said integral identifier, said matrix having an internal surface extending radially inward beyond and radially outward beyond said reinforcement layer thereby forming a composite tube of a desired thickness.

2. The composite element, claimed in claim 1, wherein: said matrix comprises resin and epoxy constituents.

3. A composite element especially adapted for conveying fluid, comprising:
   a knitted reinforcement layer comprising a plurality of interlocking loops of fiber formed in a plurality of rows, and adjacent rows interlocking one another at a single interlocking point for corresponding interlocking pairs of loops to form a first knitted pattern;
   an integral identifier incorporated within said knitted reinforcement layer, said integral identifier comprising at least one of (i) a second knitted pattern incorporated within said first knitted pattern, and said second knitted pattern being visually distinct from said first knitted pattern and (ii) a plurality of different threads or fibers being visually distinct from threads or fibers of said first knitted pattern;
   a matrix applied over said reinforcement layer, said matrix comprising resin and epoxy constituents, said matrix filling voids between said loops of said reinforcement layer, and between and around both said reinforcement layer and said integral identifier, said matrix having an internal surface extending radially inward beyond and radially outward beyond said reinforcement layer thereby forming a composite tube of a desired thickness; and
   wherein said reinforcement layer has a variable diameter along its length, and at least one non-circular cross-sectional area defining at least one of a plurality of end configurations, said end configurations comprising at least one of a flange, a coupler, or a junction.

4. The composite element, claimed in claim 1, wherein: said second knitted pattern includes a plurality of interlocking loops of fiber having a different size or different density as compared to said interlocking loops of said first knitted pattern, thereby making said second knitted pattern visually distinct from said first knitted pattern.

5. The composite element, claimed in claim 1, wherein: said plurality of different threads or fibers include at least one of a different color, texture, or size, thereby making said plurality of different threads or fibers visually distinct from threads or fibers of said first knitted pattern.

6. The composite element, claimed in claim 1, wherein: said knitted reinforcement layer comprises the interlocking loops arranged in a plurality of rows and columns, adjacent rows and adjacent columns being interlocked with one another, wherein fibers used to create the knitted pattern follow meandering non-parallel paths thereby forming said plurality of interlocking loops.

7. The composite element, claimed in claim 1, wherein: said integral identifier includes at least one of assembly instructions, a flow direction, attaching instructions, or identification data.

8. The composite element, claimed in claim 7, wherein: said identification data includes at least one of a part number, a serial number, a manufacturers name, a date, a cage code, a location, a color coding, a part specification, a conductive/nonconductive area, a bonding region, an aircraft/vehicle coordinate, a material description, or a material designation.

9. A composite element especially adapted for conveying fluid, comprising:
   a knitted reinforcement layer comprising a plurality of interlocking loops of fiber formed in a plurality of rows, and said adjacent rows interlocking one another to form a first knitted pattern;
   an integral identifier incorporated within said knitted reinforcement layer, said integral identifier comprising an RFID tag;
   a matrix applied over said reinforcement layer, said matrix comprising resin and epoxy constituents, said matrix filling voids between said loops of said reinforcement layer, and between and around both said reinforcement layer and said integral identifier, said matrix having an internal surface extending radially inward beyond and radially outward beyond said reinforcement layer and said RFID tag thereby forming a composite tube of a desired thickness.

10. The composite element, claimed in claim 9, wherein: said matrix comprises resin and epoxy constituents.

11. The composite element, claimed in claim 9, wherein: said reinforcement layer has a variable diameter along its length, and at least one non-circular cross-sectional area defining at least one of a plurality of end configurations, said end configurations comprising at least one of a flange, a coupler, or a junction.

12. The composite element, claimed in claim 9, wherein: said RFID tag is a passive RFID tag.

13. The composite element, claimed in claim 9, wherein: said RFID tag is an active RFID tag.

14. The composite element, claimed in claim 12, wherein: a coil of said passive RFID tag is made from selected fibers of said knitted reinforcement layer.

15. A composite element especially adapted for conveying fluid, comprising:
   a knitted reinforcement layer comprising a plurality of interlocking loops of fiber formed in a plurality of rows, and adjacent rows interlocking one another at a single interlocking point for corresponding interlocking pairs of loops to form a first knitted pattern;
   an integral identifier incorporated within said knitted reinforcement layer, said integral identifier comprising at least one of (i) a second knitted pattern incorporated within said first knitted pattern, and said second knitted pattern being visually distinct from said first knitted pattern and (ii) a plurality of different threads or fibers being visually distinct from threads or fibers of said first knitted pattern;

a matrix applied over said reinforcement layer, said matrix comprising resin and epoxy constituents, said matrix filling voids between said loops of said reinforcement layer, and between and around both said reinforcement layer and said integral identifier, said matrix having an internal surface extending radially inward beyond and radially outward beyond said reinforcement layer thereby forming a composite tube of a desired thickness; and wherein the knitted reinforcement layer comprises at least one material with resistive or conductive properties.

16. The composite of claim 1, wherein an exterior surface of the composite is polished or painted.

17. A composite element especially adapted for conveying fluid, comprising:

a knitted reinforcement layer comprising a plurality of interlocking loops of fiber formed in a plurality of rows, and adjacent rows interlocking one another at a single interlocking point for corresponding interlocking pairs of loops to form a first knitted pattern;

an integral identifier incorporated within said knitted reinforcement layer, said integral identifier comprising at least one of (i) a second knitted pattern incorporated within said first knitted pattern, and said second knitted pattern being visually distinct from said first knitted pattern and (ii) a plurality of different threads or fibers being visually distinct from threads or fibers of said first knitted pattern;

a matrix applied over said reinforcement layer, said matrix comprising resin and epoxy constituents, said matrix filling voids between said loops of said reinforcement layer, and between and around both said reinforcement layer and said integral identifier, said matrix having an internal surface extending radially inward beyond and radially outward beyond said reinforcement layer thereby forming a composite tube of a desired thickness; and wherein the electronic element is incorporated into the first knitted pattern or the second knitted pattern.

18. The composite element of claim 9, wherein:

said second knitted pattern includes a plurality of interlocking loops of fiber having a different size or different density as compared to said interlocking loops of said first knitted pattern, thereby making said second knitted pattern visually distinct from said first knitted pattern.

19. The composite element of claim 9, further comprising an electronic element, wherein the electronic element is incorporated into the first knitted pattern or the second knitted pattern.

20. The composite element of claim 1 wherein said adjacent rows include at least three adjacent rows.

* * * * *